(12) United States Patent
Liu et al.

(10) Patent No.: US 8,640,565 B2
(45) Date of Patent: Feb. 4, 2014

(54) CONTROLLER FOR ROTATION AND MOVEMENT MOTION

(76) Inventors: Fan-Yu Liu, Taichung (TW); Geng-Xue Liu, Kaohsiung (TW)

( * ) Notice: Subject to any disclaimer, the term of this patent is extended or adjusted under 35 U.S.C. 154(b) by 208 days.

(21) Appl. No.: 13/212,471

(22) Filed: Aug. 18, 2011

(65) Prior Publication Data

US 2012/0042747 A1    Feb. 23, 2012

(30) Foreign Application Priority Data

Aug. 20, 2010 (TW) .................................. 99127889 A

(51) Int. Cl.
*F16H 55/17*     (2006.01)
*F16H 29/00*     (2006.01)
*F16K 31/44*     (2006.01)
*F16K 31/02*     (2006.01)

(52) U.S. Cl.
USPC ................... 74/436; 74/434; 74/122; 74/112; 74/124; 74/125; 251/129.11; 251/249

(58) Field of Classification Search
USPC ........... 74/436, 434, 111, 112, 118, 122, 124, 74/125; 251/129.11, 249; 137/331
See application file for complete search history.

(56) References Cited

U.S. PATENT DOCUMENTS

| | | | | |
|---|---|---|---|---|
| 2,795,150 A | * | 6/1957 | Seidler | 74/436 |
| 3,153,952 A | * | 10/1964 | Thoma | 74/822 |
| 3,157,058 A | * | 11/1964 | Haller | 74/89.38 |
| 3,240,070 A | * | 3/1966 | Martin et al. | 73/864.23 |
| 3,248,953 A | * | 5/1966 | Holper et al. | 74/10.15 |
| 3,456,521 A | * | 7/1969 | Van Der Maaden | 74/436 |
| 3,638,510 A | * | 2/1972 | Staller | 74/436 |
| 2004/0184683 A1 | * | 9/2004 | Kuo et al. | 384/7 |

* cited by examiner

*Primary Examiner* — David M Fenstermacher
*Assistant Examiner* — Emily Cheng
(74) *Attorney, Agent, or Firm* — Banger Shia

(57) ABSTRACT

A controller of the present invention is provided for valve to be connected thereto. The controller is used for executing rotation and movement motion so as to operate the stem of the valve and to control connection conditions of the valve. As such, the valve assembled with the controller can be controlled and switched automatically. Cost of management of factories is minimized.

18 Claims, 9 Drawing Sheets

CONTROLLER FOR ROTATION AND MOVEMENT MOTION

BACKGROUND OF THE INVENTION

1. Field of the Invention

The present invention relates to a controller which can execute motions of rotation and movement so as to operate stem of multiport valve.

2. Description of the Prior Art

Valve is used for connecting tubes and conducting water or gas into a predetermine pathway. Some specialized valves are designed for factories, having multiple pathways or ports to connect and control. To avoid incorrect connection, the valves are usually constructed with insurance structure. For switching, user should not only turn stem of the valve, but pull up the stem in advance. Though the valves with insurance structure are much more complicated, and are difficult to be used, accuracy of the connection of pathways can be guaranteed.

However, as mentioned above, the valves with insurance structure is difficult to be used. Operational motion of the stem is complicated. Thus, the valves can be operated by only manual operation. That is to say, factories which adopt the valves with insurance structure have to control the valves by staff directly. As a result, cost of management of the factories would be inevitably increased.

The present invention is, therefore, arisen to obviate or at least mitigate the above mentioned disadvantages.

SUMMARY OF THE INVENTION

The main object of the present invention is to provide a controller which is able to execute motions of rotation and movement so as to operate complicated valves as described above.

To achieve the above and other objects, a controller of the present invention is provided for operating or executing rotation and movement motion. The controller includes a shell, a main axle, a working axle, a rotation means, a movement means, and an actuator.

The main axle is rotatably disposed on the shell. The main axle is rotatable about a longitudinal direction of itself.

The working axle is disposed on the shell rotatably and movably. The working axle is rotatable about an axis defined by the working axle. The working axle is movable along the axis.

The rotation means is used for intermittently turning the working axle to rotate about the axis when the main axle rotates. The movement means is used for moving the working axle to reciprocate along the axis when the main axle rotates.

The actuator is connected to the main axle. The actuator is adapted for turning the main axle to rotate.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
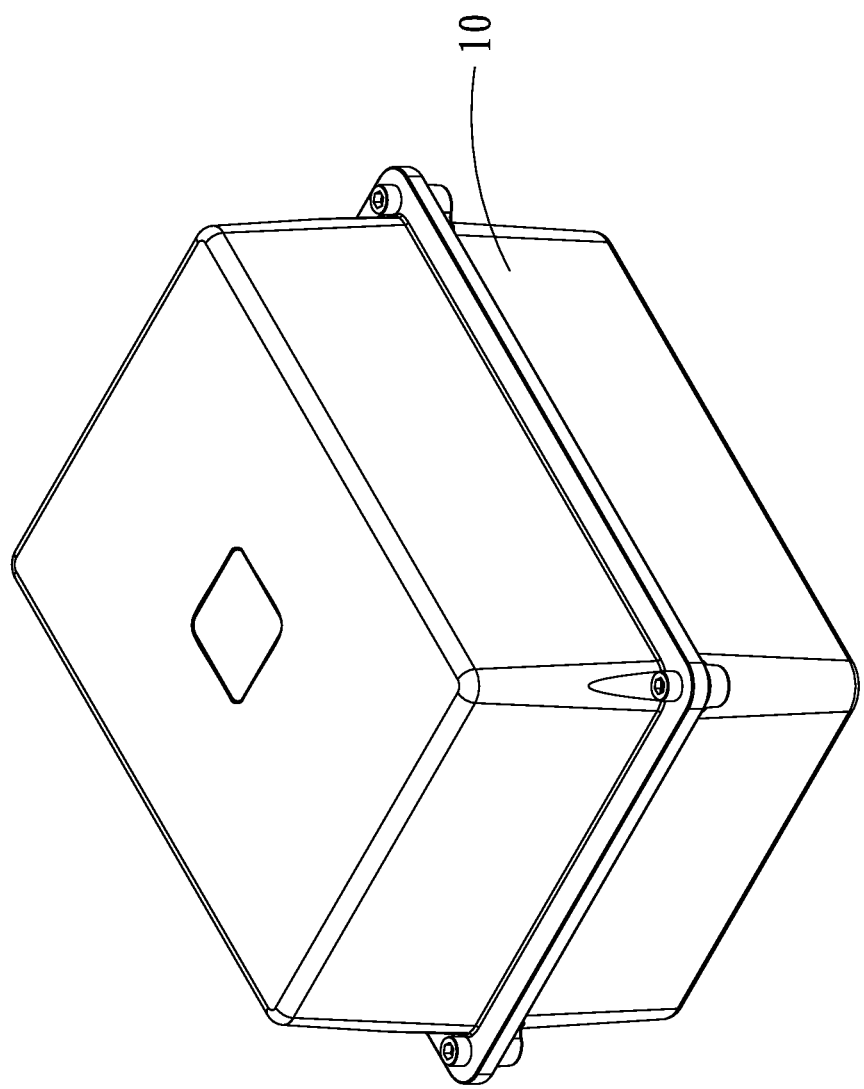
FIG. 1 is a stereogram showing a first embodiment of the present invention.
Figure 2:
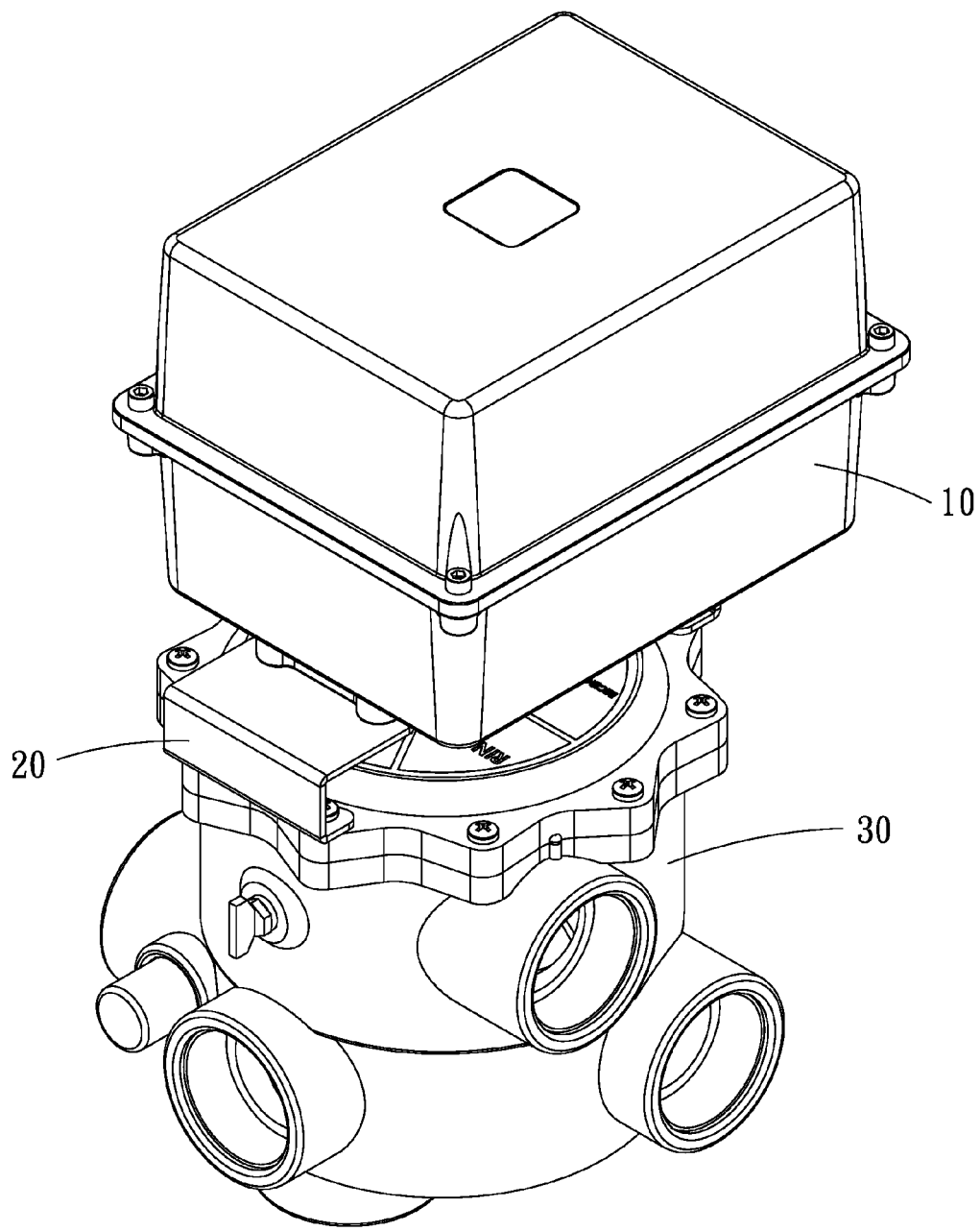
FIG. 2 is a combination drawing showing a first embodiment of the present invention and a valve.
Figure 3:
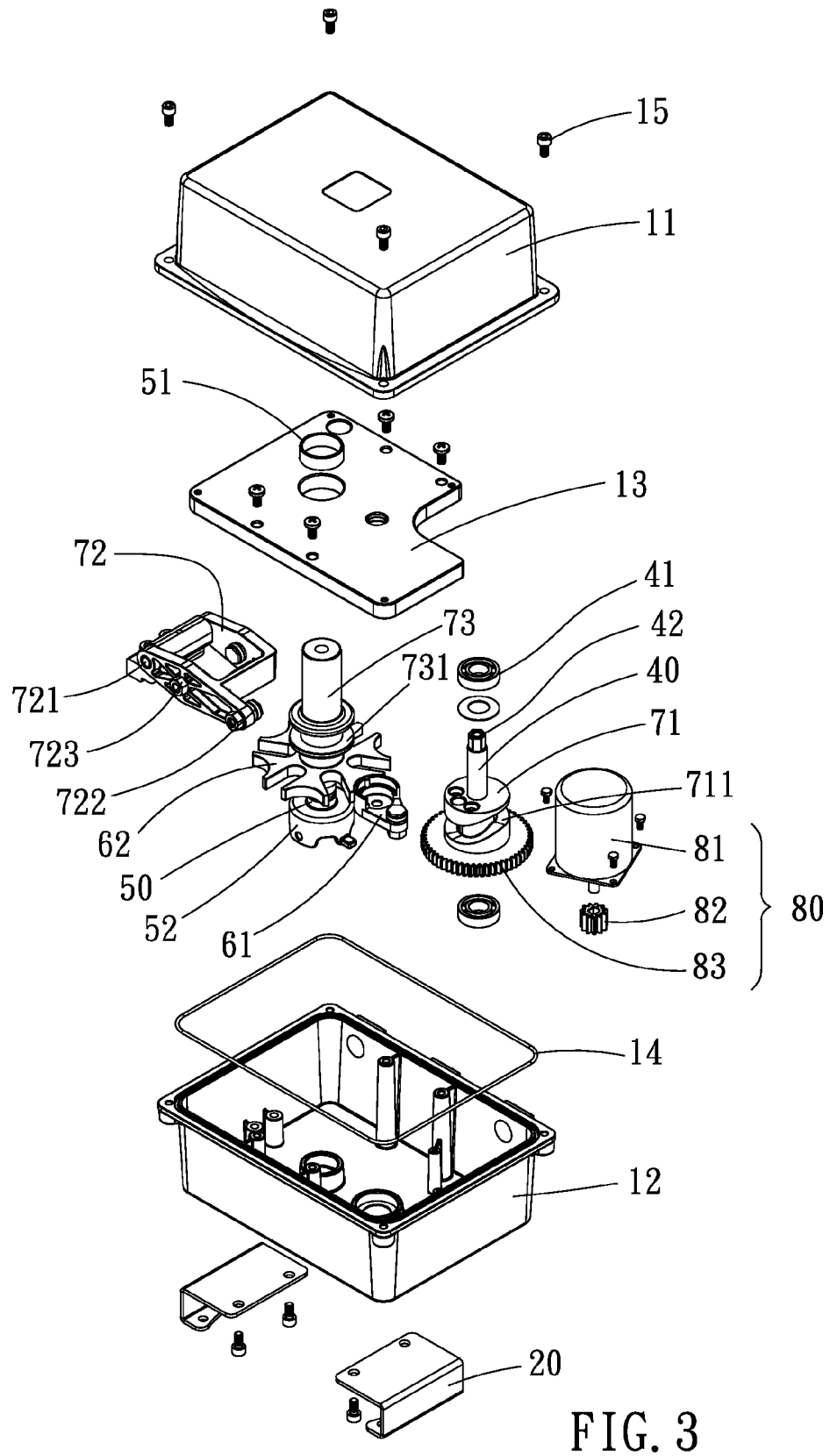
FIG. 3 is a break down drawing showing a first embodiment of the present invention.
Figure 4:
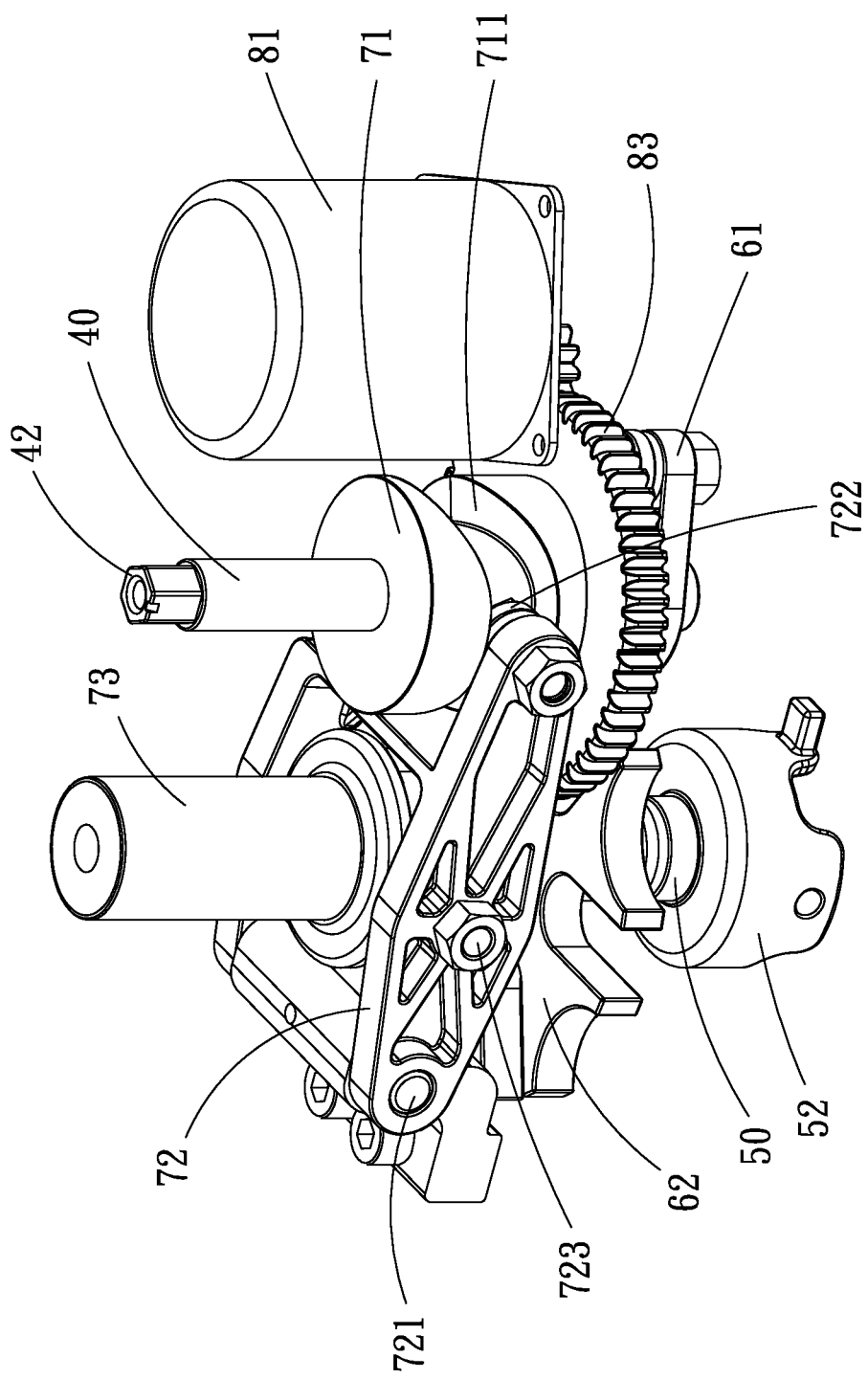
FIG. 4 is a stereogram showing partial components of a first embodiment of the present invention.
Figure 5:
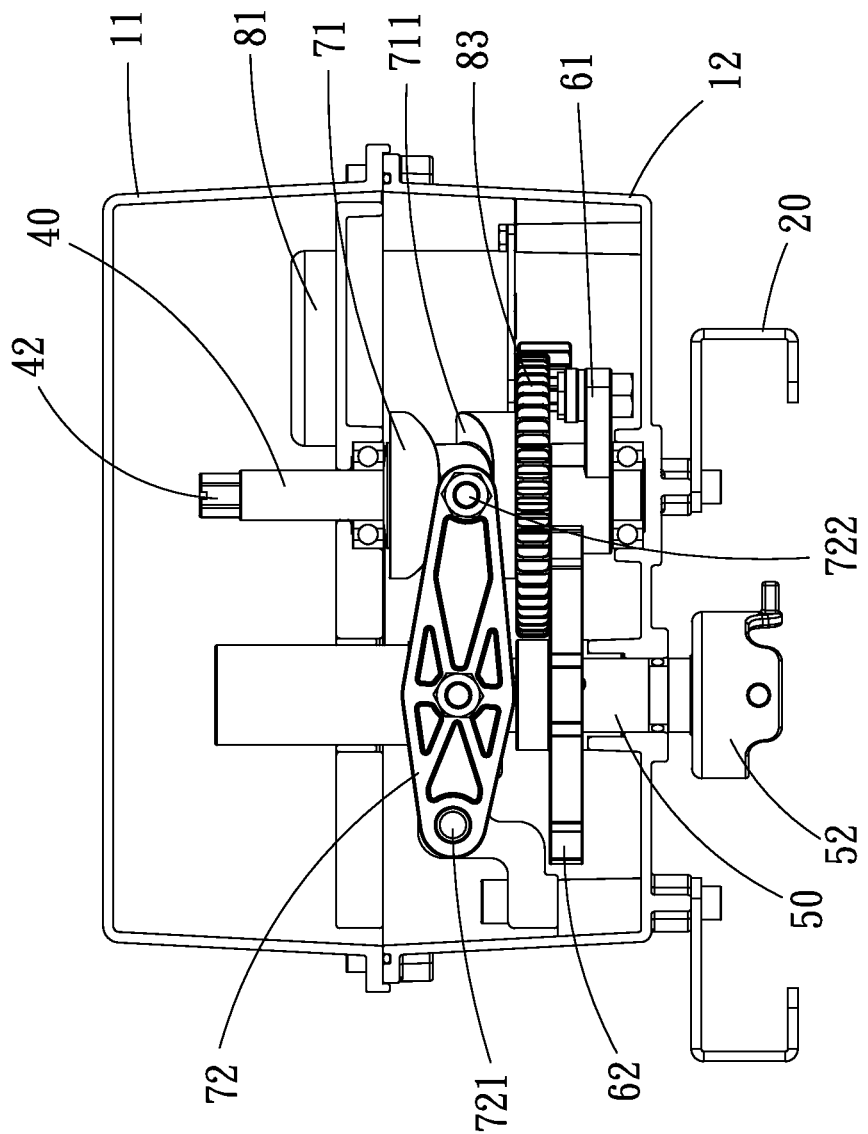
FIG. 5 is a profile showing a first embodiment of the present invention.
Figure 6:
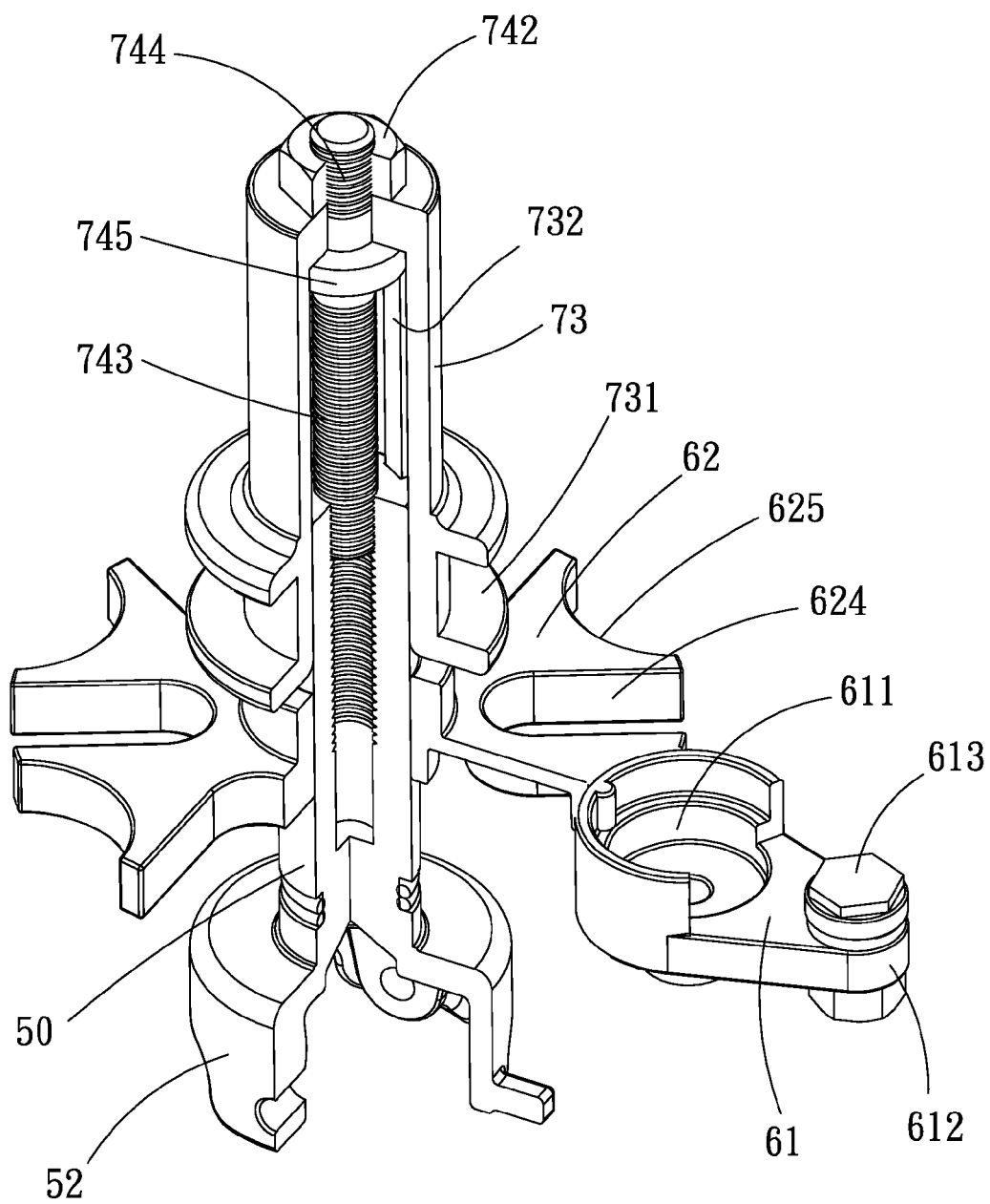
FIG. 6 is a partial profile showing a first embodiment of the present invention.
Figure 7:
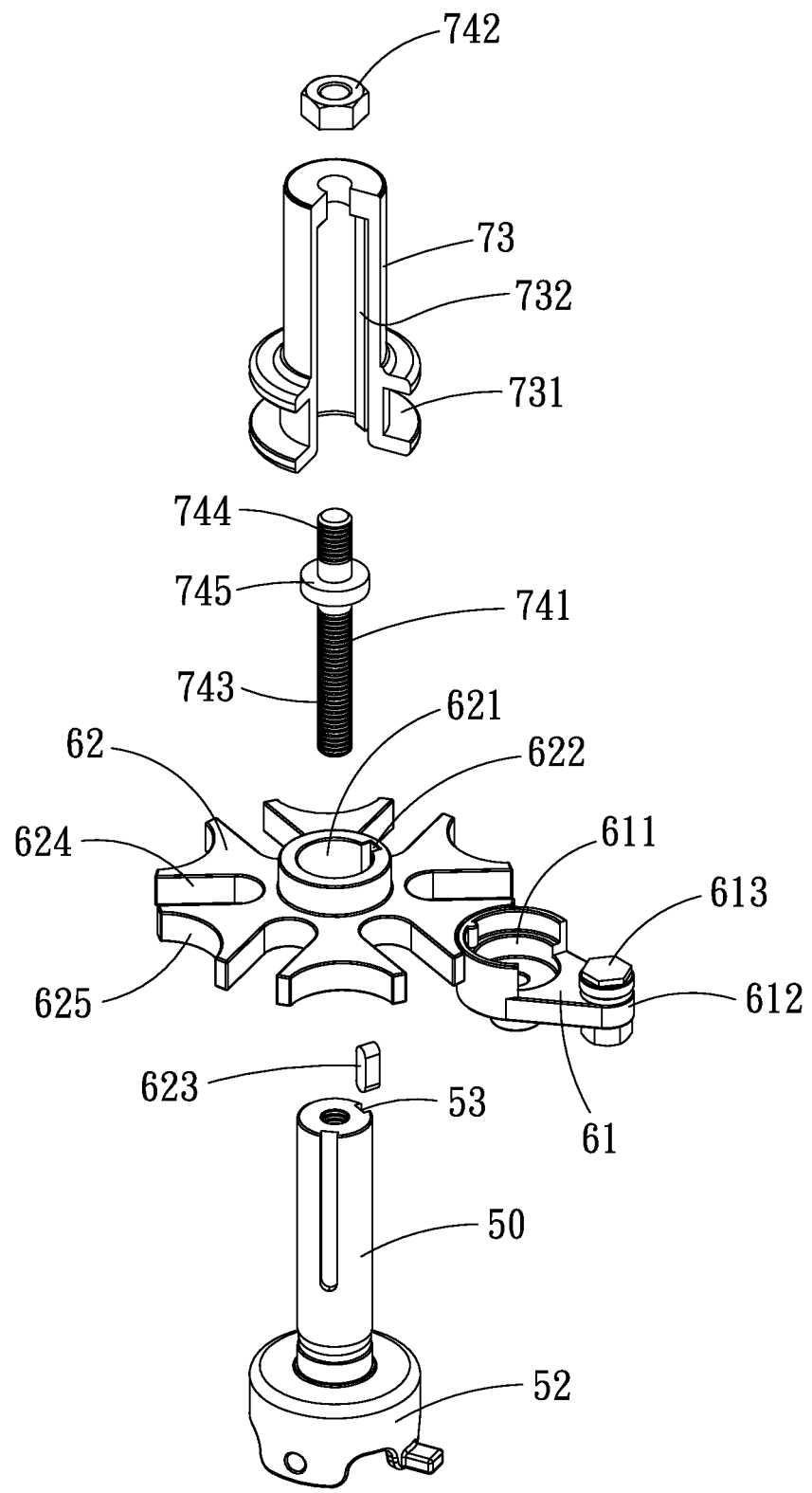
FIG. 7 is a partial break down drawing showing a first embodiment of the present invention.

Please refer to FIG. 1 to FIG. 3 for a first embodiment of the present invention. The controller of the present embodiment is provided for operating or executing rotation and movement motion. The controller can be assembled on fixation rack 20, and further firmly positioned on a multiport valve 30 or other similar valves. Thus, the controller can control connection conditions of the valve 30 by operating stem of the valve 30. In other possible embodiments of the present invention, the controller may be used for executing rotation and movement motion so as to motivate other objects. In some cases, the controller may be used for seal cover detachment.

Please refer to FIG. 3 to FIG. 7. The controller of the present embodiment includes a shell 10, a main axle 40, a working axle 50, a rotation means, a movement means, and an actuator 80.

The shell 10 includes an upper shell 11, a lower shell 12, a partition plate 13, a gasket 14, and several threaded members 15. The upper shell 11 and the lower shell 12 are fixed to each other by the threaded members 15 and define a chamber therein, so that the other components of the present embodiment can be received in the chamber. The gasket 14 is positioned between the upper shell 11 and the lower shell 12. The partition plate 13 is firmly disposed on the lower shell 12.

The main axle 40 is rotatably disposed on the shell 10, being received in the chamber. The main axle 40 is able to rotate about a longitudinal direction of itself. One or several bearings 41 may be disposed between the main axle 40 and the shell 10 so as to reduce the friction when main axle rotates. One end of the main axle 40 is formed with a driving head 42 which is a polygonal column. Thus, wrench or other similar tools can engage with the main axle 40 and turn the main axle 40 to rotate if necessary.

The working axle 50 is disposed on the shell 10 rotatably and movably, being received in the chamber, too. The working axle 50 is able to rotate about an axis defined by the working axle 50, and is able to move along the axis. Bushing 51 or bearing can be disposed between the working axle 50 and the shell 10 also. One end of the working axle 50 is formed with an adapter 52 which is used for connecting to or engaging with stem of the valve. The other end of the working axle 50 is formed with a threaded hole. In the present embodiment, the working axle 50 is parallel to the main axle 40. However, it is still possible that the working axle 50 slants to or is perpendicular to the main axle 40.

The rotation means is used for intermittently turning the working axle 50 to rotate about the axis when the main axle 40 rotates. More particularly, the rotation means includes a transmission arm 61 and a transmission plate 62. The transmission arm 61 has a first end 611 and a second end 612. The first end 611 is attached to the main axle 40, so that the transmission arm 61 achieves a rotational operation relationship with the main axle 40. The second end 612 extends away from the main axle 40 radially. Thus, when the transmission arm 61 rotates, the second end 612 moves in a circular motion. The second end 612 has a first position, a second position, and a third position. The second end 612 approaches to the working axle 50 when the second end 612 moves to the second position. Preferably, the second end 612 has a protrusion 613 protruding along an axial direction which defined by the axis.

The transmission plate 62 is disposed on the working axle 50, achieving a rotational operation relationship with the working axle 50. The transmission plate 62 is formed with an axial hole 621. The working axle 50 penetrates through the axial hole 621. The transmission plate 62 and the working axle 50 are formed with grooves 622, 53 respectively. Another piece 623 is received and lodged in the grooves 622, 53, being positioned between the transmission plate 62 and the working axle 50, so that the transmission plate 62 achieves a rotational operation relationship with the working axle 50. In other possible embodiments of the present invention, the axial hole 621 and the working axle 50 may be formed with non-circular cross sections so as to achieve the rotational operation relationship.

Figure 9:
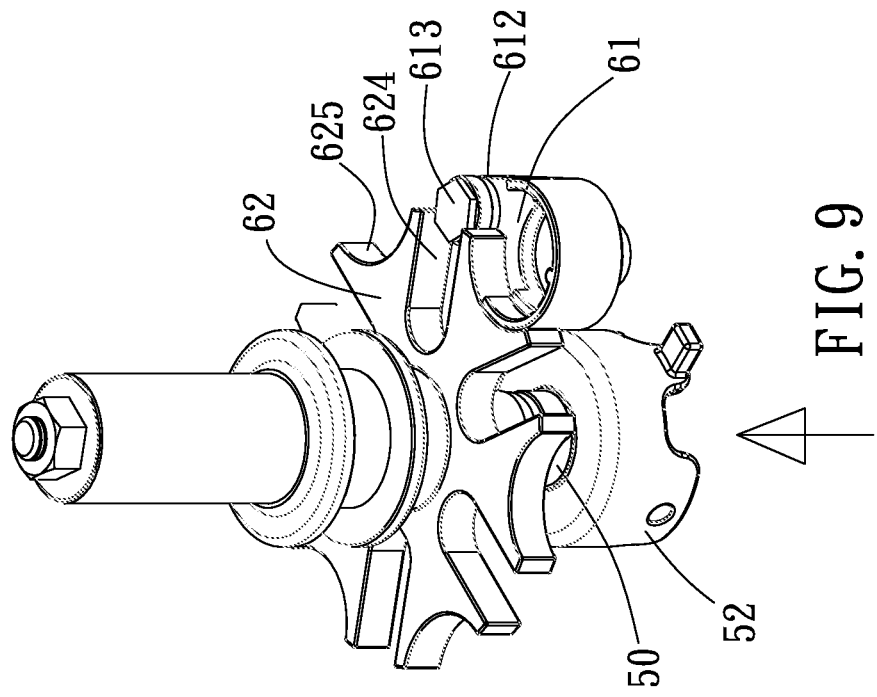
FIG. 8 to FIG. 11 are serial diagrams showing motion conditions of a first embodiment of the present invention.
Figure 8:
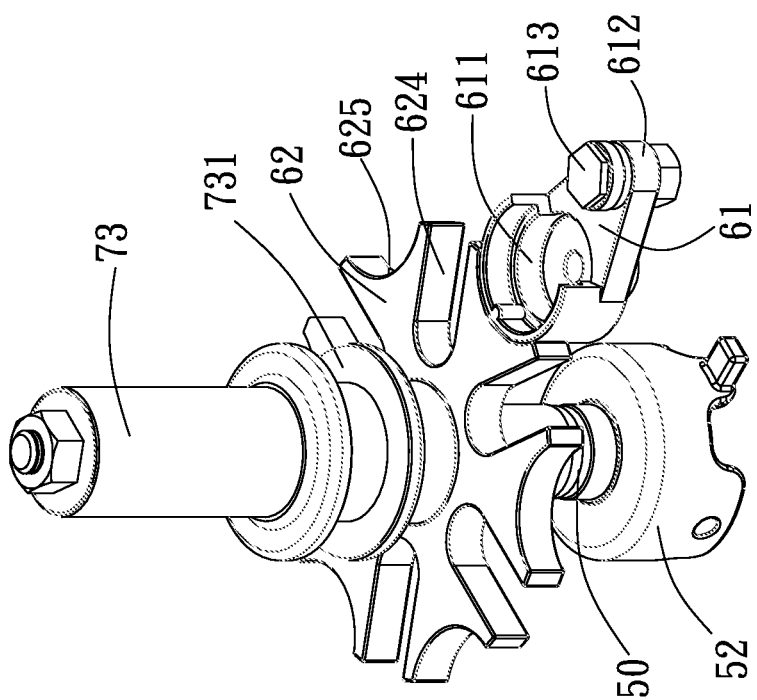
Figure 11:
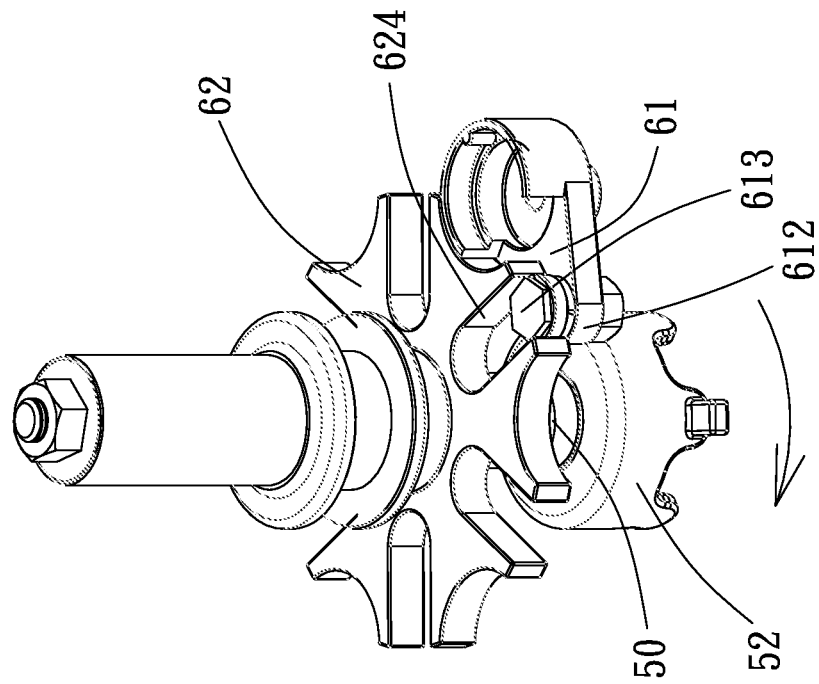
Figure 10:
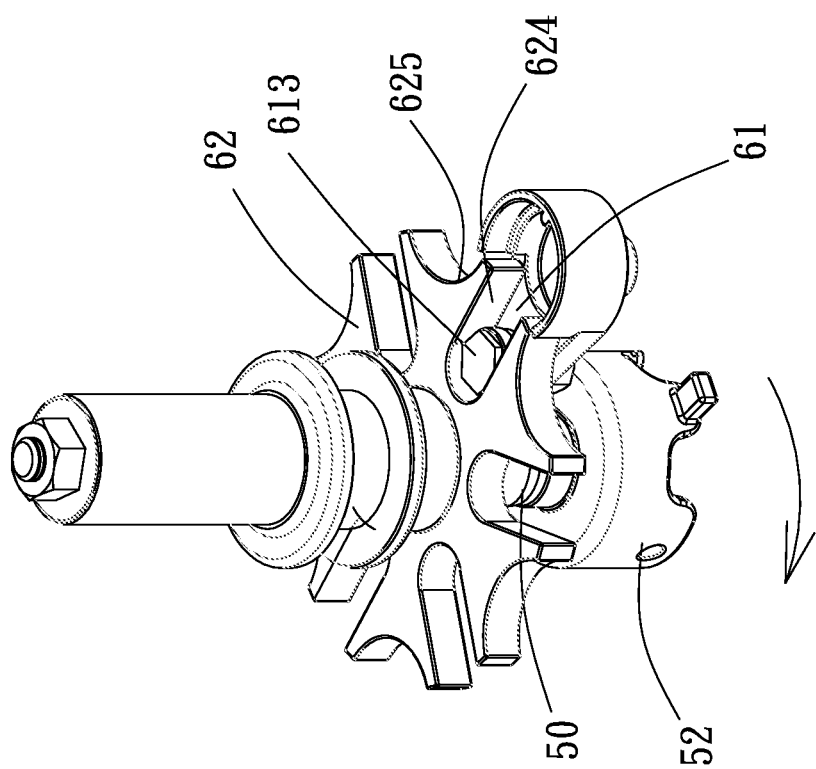

When the second end 612 moves to a position between the first position and the second position or between the second position and the third position, the transmission 61 arm drives the transmission plate 62 to rotate. When the second end 612 moves to a position between the third position and the first position, motion of the transmission plate 62 is independent from motion of the transmission arm 61. More particularly, the transmission plate 62 is formed with several guiding grooves 624 which extend axially to a periphery of the transmission plate 62. The guiding grooves 624 are arranged equidistantly and circularly on transmission plate 62. Equidistantly arrangement here means that distances between any two guiding grooves 624 are consistent, equal to other distances between any two guiding grooves 624. The transmission plate 62 is formed with several recessed surfaces 625. The recessed surfaces 625 are arranged equidistantly and circularly on the transmission plate 62, and arranged along the periphery of the transmission plate 62. Each of the recessed surfaces 625 is located between two adjacent guiding grooves 624. Please refer to FIG. 8 and FIG. 9. When the second end 612 moves to the first position, the second end 612 is slidably received in the guiding groove 624. Thus, the transmission plate 62 is motivated by motion of the second end 612, and the transmission plate 62 is driven to rotate by the transmission arm 61. Please refer to FIG. 10. The transmission arm 61 still drives the transmission plate 62 to rotate when the second end 612 moves toward the second position. Please refer to FIG. 11. When the second end 612 moves to the third position, the second end 612 leaves the guiding groove 624. Thus, motion of the transmission plate 62 is independent from motion of the transmission arm 61. That is to say, the transmission arm 61 can not bring or drive the transmission plate 62 to rotate. Later, when the second end moves to the first position, as shown in FIG. 9, again, the second end 612 is received in another guiding groove. Thus, the transmission arm 61 rotating together with the main axle 40 can intermittently turn the transmission plate 62 to rotate, and the working rotates together with the transmission plate 62. In other possible embodiments of the present invention, the rotation means may be constructed with gear set or worm gear set which is formed with sliding planes and is provided with non-full-time transmission function.

Please refer to FIG. 3 to FIG. 7. The movement means is used for moving the working axle 50 to reciprocate along the axis when the main axle 40 rotates. More particularly, the movement means includes a rail column 71, a linkage, and a abutting member 73, and may further include an adjustment device. The rail column 71 is disposed on the main axle 40, achieving a rotational operation relationship with the main axle 40. The rail column 71 is formed with a first track 711 extending therearound. The first track 711 deflects along an axial direction defined by the main axle 40. In the present embodiment, the main axle 40 is parallel to the working axle 50, so that the axial direction of the main axle 40 and the axial direction of the axis of the working axle 50 is the same. Deflection here means that the first track 711 is not totally located on a single lateral cross section of the main axle 40. The linkage 72 has a pole 721, a first slidable member 722, and a second slidable member 723. The pole 721 is disposed on the shell 10, so that the linkage 72 is able to pivot about the pole 721 with respect to the shell 10. The pole 721 is perpendicular to the axial direction of the main axle 40. The first slidable member 722 is slidably received in the first track 711. The abutting member 73 achieves an operation relationship with the working axle 50. The abutting member 73 is formed with a circular second track 731 extend around the working axle 50. The second slidable member 723 is slidably received in the second track 731. The adjustment device is disposed between the abutting member 73 and the working axle 50 so as to adjust distance between the second track 731 and the adapter 51 of the working axle 50. More particularly, the working axle 50 is sheathed by the abutting member 73. The abutting member 73 is formed with a rib 732. The rib 732 is slidably received in the groove 53, so that the working axle 50 achieves a rotational operation relationship with the abutting member 73. The adjustment device includes a screw 741 and a fixation member 742. The screw 741 has a first section 743 and a second section 744. The screw 741 is formed with a collar 745 located between the first section 743 and the second section 744. The first section 743 is engaged to the threaded hole of the working axle 50 along the axial direction. The second section 744 penetrates through the abutting member 73, and engages with the fixation member 742. Thus, the abutting member 73 is firmly positioned between the fixation member 742 and the collar 745. Position of the working axle 50 can be adjusted by rotating the screw 741.

Accordingly, the rail column 71 would rotate together with the main axle 40 when the main axle 40 rotates. The first track 711 would rotate and bring the first slidable member 722 to move up and down, so that the linkage 72 would pivot back and forth. The second slidable member 723 is then moved together with the linkage 72, and motivates the abutting member 73 and the working axle 50 to reciprocate. In other possible embodiments of the present invention, the movement means may be constructed with eccentric cam or crankshaft.

The actuator 80 is connected to the main axle 40, and is used for turning the main axle 40 to rotate. More particularly, the actuator 80 includes a motor 81 and a decelerator. The motor 81 has a shaft. The motor 81 is firmly disposed on the shell 10. The motor 81 can be driven by electric power, and can drive the shaft to rotate. The decelerator includes a smaller gear 82 and a larger gear 83. The smaller gear 82 is firmly disposed on the shaft so as to achieve a rotational operation relationship with the shaft. The larger gear 83 is firmly disposed on the main axle 40 so as to achieve a rotational operation relationship with the main axle 40. The larger gear 83 engages with the smaller gear 82. Thus, the main axle 40 would rotate when the motor 81 is powered since the shaft, the gears 82, 83, and the main axle 40 would rotate simultaneously.

To conclude, the controller of the present embodiment can be disposed on and fit with a multiport valve. When the controller is activated, the actuator would be powered and the main axle would rotate. The movement means can lift the working axle up firstly. The rotation means rotates the working axle with a predetermined angle. The movement means moves the working axle down to the initial level finally. Thus, the controller can be introduced in factories for controlling multiport valve automatically. Cost of management of factories can be cut down since required labor is minimized.

What is claimed is:

1. A controller for rotation and movement motion, comprising:
   a shell;
   a main axle, rotatably disposed on the shell, the main axle being rotatable about a longitudinal direction of the main axle;
   a working axle, disposed on the shell rotatably and movably, the working axle being rotatable about an axis defined by the working axle, the working axle being movable along the axis;
   a rotation means, used for intermittently turning the working axle to rotate about the axis when the main axle rotates;
   a movement means, used for moving the working axle to reciprocate along the axis when the main axle rotates; and
   an actuator, connected to the main axle, the actuator being adapted for turning the main axle to rotate;
   wherein the main axle is parallel to the working axle, the movement means comprises a rail column, a linkage, and an abutting member, the rail column is disposed on the main axle, the rail column achieves a rotational operation relationship with the main axle, the rail column is formed with a first track extending therearound, the first track deflects along an axial direction defined by the main axle, the linkage has a pole, a first slidable member, and a second slidable member, the pole is disposed on the shell, the linkage is pivotable about the pole with respect to the shell, the pole is perpendicular to the axial direction, the first slidable member is slidably received in the first track, the abutting member achieves an operation relationship with the working axle, the abutting member is formed with a circular second track extending around the working axle, and the second slidable member is slidably received in the second track;
   wherein the pole longitudinally extends in a direction perpendicular to the axial direction, the linkage integrally extends from the pole and terminates in a position which corresponds to a position of the first track, one end of the linkage is pivotally disposed radially around and non-displaceable relative to the pole, the first track is a groove annularly radially recessed on a circumferential outer surface of the rail column, the second track is a groove radially recessed on a circumferential outer surface of the abutting member, the first slidable member extends from the other end of the linkage and radially into the first track, the second slidable member extends from an intermediate portion of the linkage and radially into the second track, and the pole serves as a common swinging center of the first slidable member and the second slidable member.

2. The controller of claim 1, wherein the main axle is parallel to the working axle, the rotation means comprises a transmission arm and a transmission plate, the transmission arm has a first end and a second end, the first end is attached to the main axle, so that the transmission arm achieves a rotational operation relationship with the main axle, the second end extends away from the main axle radially, the second end moves in a circular motion when the transmission arm rotates, the second end has a first position, a second position, and a third position, the second end approaches to the working axle when the second end moves to the second position, the transmission plate is disposed on the working axle, the transmission plate achieves a rotational operation relationship with the working axle, the transmission arm drives the transmission plate to rotate when the second end moves to a position between the first position and the second position or between the second position and the third position, and motion of the transmission plate is independent from motion of the transmission arm when the second end moves to a position between the third position and the first position;
   wherein the transmission plate and the second track are coaxially arranged with the working axle and synchronous in motion.

3. The controller of claim 2, wherein the transmission plate is formed with plural guiding grooves, each of the guiding grooves extends radially, each of the guiding grooves extends to a periphery of the transmission plate, the guiding grooves are arranged equidistantly and circularly on the transmission plate, and the second end is slidably received in one of the guiding grooves when the second end moves to the position between the first position and the second position or between the second position and the third position.

4. The controller of claim 3, wherein the periphery of the transmission plate is formed with plural recessed surfaces, the recessed surfaces are arranged equidistantly and circularly on the transmission plate, each of the recessed surfaces is located between two adjacent guiding grooves of said guiding grooves, and the second end has a protrusion protruding along an axial direction defined by the axis.

5. The controller of claim 4, wherein the main axle is formed with a driving head on one end thereof, and the driving head is a polygonal column.

6. The controller of claim 4, wherein the actuator comprises a motor and a decelerator, the motor is firmly disposed on the shell, the decelerator connects the motor to the main axle, and the motor is adapted for electric power to drive to actuate the decelerator, so that the decelerator turns the main axle to rotate.

7. The controller of claim 3, wherein the actuator comprises a motor and a decelerator, the motor is firmly disposed on the shell, the decelerator connects the motor to the main axle, and the motor is adapted for electric power to drive to actuate the decelerator, so that the decelerator turns the main axle to rotate.

8. The controller of claim 3, wherein the main axle is formed with a driving head on one end thereof, and the driving head is a polygonal column.

9. The controller of claim 2, wherein the main axle is formed with a driving head on one end thereof, and the driving head is a polygonal column.

10. The controller of claim 2, wherein the actuator comprises a motor and a decelerator, the motor is firmly disposed on the shell, the decelerator connects the motor to the main axle, and the motor is adapted for electric power to drive to actuate the decelerator, so that the decelerator turns the main axle to rotate;
    wherein the motor, the first track and the second track are disposed on the same side relative to the transmission plate;
    wherein the decelerator includes a smaller gear and a larger gear, the smaller gear is firmly sleeved on a shaft of the motor, the larger gear is firmly sleeved on the main axle, the larger gear is located between the rail column and the transmission arm and engages with the smaller gear.

11. The controller of claim 2, wherein the actuator comprises a motor and a decelerator, the motor is firmly disposed on the shell, the decelerator connects the motor to the main axle, and the motor is adapted for electric power to drive to actuate the decelerator, so that the decelerator turns the main axle to rotate.

12. The controller of claim 1, wherein the working axle is sheathed by the abutting member, the working axle achieves a rotational operative relationship with the abutting member, one end of the working axle is formed with a threaded hole, another end of the working axle is formed with an adapter, the movement means comprises an adjustment device, the adjustment device comprises a screw and a fixation member, the screw has a first section and a second section, the screw is formed with a collar, the collar is located between the first section and the second section, the first section engages with the threaded hole, the second section penetrates through the abutting member, the fixation member engages with the second section, and the abutting member is firmly positioned between the fixation member and the collar.

13. The controller of claim 12, wherein the main axle is formed with a driving head on one end thereof, and the driving head is a polygonal column.

14. The controller of claim 12, wherein the actuator comprises a motor and a decelerator, the motor is firmly disposed on the shell, the decelerator connects the motor to the main axle, and the motor is adapted for electric power to drive to actuate the decelerator, so that the decelerator turns the main axle to rotate.

15. The controller of claim 1, wherein the main axle is formed with a driving head on one end thereof, and the driving head is a polygonal column.

16. The controller of claim 15, wherein the actuator comprises a motor and a decelerator, the motor is firmly disposed on the shell, the decelerator connects the motor to the main axle, and the motor is adapted for electric power to drive to actuate the decelerator, so that the decelerator turns the main axle to rotate.

17. The controller of claim 1, wherein the actuator comprises a motor and a decelerator, the motor is firmly disposed on the shell, the decelerator connects the motor to the main axle, and the motor is adapted for electric power to drive to actuate the decelerator, so that the decelerator turns the main axle to rotate.

18. The controller of claim 1, wherein the main axle is formed with a driving head on one end thereof, and the driving head is a polygonal column.

* * * * *